US009497030B2

United States Patent
Park et al.

(10) Patent No.: US 9,497,030 B2
(45) Date of Patent: Nov. 15, 2016

(54) REMOTELY CONTROLLABLE ELECTRONIC DEVICE AND SYSTEM INCLUDING THE SAME

(71) Applicant: Samsung Electronics Co., Ltd., Suwon-si, Gyeonggi-do (KR)

(72) Inventors: Jun-seok Park, Suwon-si (KR); Kyung-do Park, Suwon-si (KR); Ha-ryun Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 14/337,848

(22) Filed: Jul. 22, 2014

(65) Prior Publication Data
US 2015/0026491 A1 Jan. 22, 2015

Related U.S. Application Data

(60) Provisional application No. 61/856,875, filed on Jul. 22, 2013.

(30) Foreign Application Priority Data

Oct. 31, 2013 (KR) ............. 10-2013-0130970
May 22, 2014 (KR) ............. 10-2014-0061784

(51) Int. Cl.
*G06F 1/26* (2006.01)
*G06F 1/32* (2006.01)
*H04L 12/12* (2006.01)

(52) U.S. Cl.
CPC .......... *H04L 12/12* (2013.01); *G06F 1/3209* (2013.01); *G06F 1/3287* (2013.01); *Y02B 60/1282* (2013.01); *Y02B 60/32* (2013.01); *Y02B 60/34* (2013.01)

(58) Field of Classification Search
CPC ..... G06F 1/3209; Y02B 60/32; Y02B 60/34; H04L 12/12
USPC .................................. 713/300, 320
See application file for complete search history.

(56) References Cited

U.S. PATENT DOCUMENTS

| | | | |
|---|---|---|---|
| 7,174,130 B2 * | 2/2007 | Kurisko | H04L 63/061 455/41.2 |
| 8,369,254 B2 | 2/2013 | Sood et al. | |
| 8,527,014 B2 | 9/2013 | Amerga et al. | |
| 8,566,625 B2 | 10/2013 | Gobriel et al. | |
| 8,621,568 B2 * | 12/2013 | He | G06F 1/26 370/311 |
| 8,750,145 B2 | 6/2014 | Shaheen | |
| 2007/0207841 A1 | 9/2007 | Amerga et al. | |
| 2009/0003319 A1 | 1/2009 | Sood et al. | |
| 2009/0172163 A1 * | 7/2009 | Carroll | H04L 12/12 709/226 |
| 2011/0128911 A1 | 6/2011 | Shaheen | |
| 2012/0120958 A1 * | 5/2012 | Mahadevan | H04L 12/12 370/392 |
| 2012/0278636 A1 * | 11/2012 | Lin | H04L 12/12 713/300 |
| 2013/0007484 A1 | 1/2013 | Gobriel et al. | |
| 2014/0269283 A1 | 9/2014 | Shaheen | |

* cited by examiner

*Primary Examiner* — Mark Connolly
(74) *Attorney, Agent, or Firm* — Jefferson IP Law, LLP

(57) ABSTRACT

An electronic device is provided. The electronic device includes a controller configured to transition the electronic device into a sleep mode, and a communication interface configured to establish a network session with the external computing device when the electronic device into the sleep mode, wherein the communication interface is configured to maintain the network session with the external computing device when the electronic device is in the sleep mode, and to transition the electronic device into a non-sleep mode in response to a signal, for requesting that the electronic device gets out the sleep mode, being received through the maintained network session.

16 Claims, 11 Drawing Sheets

200

REMOTELY CONTROLLABLE ELECTRONIC DEVICE AND SYSTEM INCLUDING THE SAME

CROSS-REFERENCE TO RELATED APPLICATION(S)

This application claims the benefit under 35 U.S.C. §119 (e) of a U.S. Provisional application filed on Jul. 22, 2013 in the U.S. Patent and Trademark Office and assigned Ser. No. 61/856,875, and under 35 U.S.C. §119(a) of a Korean patent application filed on Oct. 31, 2013 in the Korean Intellectual Property Office and assigned Serial number 10-2013-0130970, and of a Korean patent application filed on May 22, 2014 in the Korean Intellectual Property Office and assigned Serial number 10-2014-0061784, the disclosures of which are incorporated herein by reference in their entirety.

TECHNICAL FIELD

The present disclosure relates to an electronic device. More particularly, the present disclosure relates to a remotely controllable electronic device.

BACKGROUND

Currently, electronic devices transition from a normal mode to a sleep mode during non-operation in order to reduce power consumption. An electronic device that enters the sleep mode is woken up by a user pressing a power button of the corresponding electronic device. Currently, an electronic device also supports a Wake on LAN (WoL) to remotely wake up the electronic device in a sleep mode.

The WoL is a method of supplying power to a network adaptor device so as to receive a specific packet when an electronic device operates in a sleep mode and wakes up the device that is in a sleep mode or is turned off when the device receives a specific packet as a magic packet in a sleep mode.

The WoL method has a range limitation, in that only a device within the same Subnet or LAN, that is, the same wireless router/switch. For example, when a user in an office wants to wake a home device up, since the office and the home do not usually share the same subnet, the user may not wake the home device up using the WoL method. In addition, since home devices, which communicate with an external network via a wireless router/switch, use a private Internet Protocol (IP) address, problems arise in that a wake-up packet is not transmitted to devices using a private IP address.

To address these problems, a Virtual Private Network (VPN) is installed, a wireless router/switch and a router are set to allow a specific external IP address and port, and a port forward method is used. However, it may be difficult for general users to set these network configurations, expensive to install the VPN, and security may be exposed when a VPN port is open.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

Accordingly, an aspect of the present disclosure is to provide a remotely controllable electronic device and a system including the same, which allows an external computing device to wake up an electronic device even if a wireless router/switch, a router, a firewall, etc. is present between the electronic device and the external computing device.

In accordance with an aspect of the present disclosure, an electronic device connected to an external computing device is provided. The electronic device includes a controller configured to transition the electronic device into a sleep mode, and a communication interface configured to establish a network session with the external computing device when the electronic device transitions into the sleep mode, wherein the communication interface is configured to maintain the network session with the external computing device when the electronic device is in the sleep mode, and to transition the electronic device into a non-sleep mode in response to a signal, for requesting that the electronic device gets out the sleep mode, being received through the maintained network session.

In accordance with another aspect of the present disclosure, a computing electronic device is provided. The computing electronic device includes a processor, and at least one communication interface using a communication protocol, wherein the processor is configured to periodically receive signals from a first electronic device through the at least one of communication interface, the signals being configured in conformity with the communication protocol, to periodically receive signals from a first electronic device through the at least one communication interface, and to determine whether the first electronic device is one of a sleep mode and a non-sleep mode, based on one of at least one of the periodically received signals and at least one of an absence of the periodic signals.

In accordance with another aspect of the present disclosure, an electronic device is provided. The electronic device includes a communication interface configured to communicate at least one of a first external electronic device and a second external electronic device in a sleep mode, and a processor, wherein the processor is configured to receive information indicating a connected/disconnected status between the first electronic device and the second electronic device in a sleep mode, from the first external electronic device through the communication interface, to transmit a signal for requesting that the second external electronic device gets out a sleep mode, to the first external electronic device through the communication interface, and to communicate with the second external electronic device through the communication interface after transmitting the signal.

In accordance with another aspect of the present disclosure, a method of controlling drive of an electronic device connected to an external computing device is provided. The method includes transitioning the electronic device into a sleep mode, establishing a network session with the external computing device when the electronic device transitions into the sleep mode, maintaining the network session with the external computing device when the electronic device is in the sleep mode, and transitioning the electronic device into a non-sleep mode in response to a signal, for requesting that the electronic device gets out the sleep mode, being received through the maintained network session.

In accordance with another aspect of the present disclosure, a method of controlling drive of a computing electronic device is provided. The method includes periodically receiving signals from a first electronic device, and determining whether the first electronic device is in one of a sleep mode and a non-sleep mode, based on one of at least one of the periodically received signals and at least one of an absence of the periodic signals.

In accordance with another aspect of the present disclosure, a system is provided. The system includes an external computing device, a first electronic device configured to establish a network session with the external computing device when the electronic device transitions into the sleep mode and to maintain the network session with the external computing device in the sleep mode, and a second electronic device configured to transmit a signal requesting that the first electronic device transition out of the sleep mode, to the external computing device, wherein the external computing device is configured to transmit a second request signal for conversion of the first electronic device into a non-sleep mode through the maintained network session in response to the first request signal being received.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
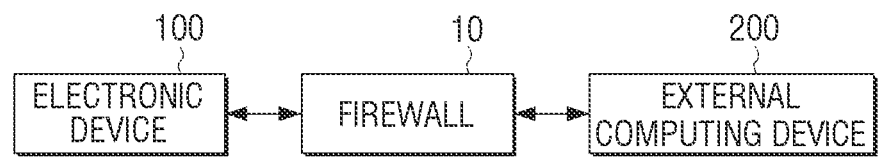
FIG. 1 is a block diagram illustrating a structure of an electronic system according to an embodiment of the present disclosure.

FIG. 1 is a block diagram illustrating a structure of an electronic system according to an embodiment of the present disclosure.

Referring to FIG. 1, an electronic system 1000 may include an electronic device 100 and an external computing device 200. In addition, a firewall 10 may be positioned between the electronic device 100 and the external computing device 200. In FIG. 1, a firewall is positioned between the electronic device 100 and the external computing device 200. However, in actual cases, a wireless router/switch, a router, and the like may be positioned instead of a firewall.

The electronic device 100 may request the external computing device 200 to transmit content stored in the external computing device 200 and receive and display the content in response to the request. The electronic device 100 may be a desk top computer, a laptop computer, a mobile computing device, a smart phone, a feature phone, a tablet computer, a set top box, a wearable device, etc., which are connectable with the Internet.

In addition, the electronic device 100 may store content and transmit the stored content to the external computing device 200 according to request of the external computing device 200. The electronic device 100 may receive a signal (which will be referred to as a wake-up command hereinafter and refers to any signal for requesting that the electronic device 100 gets out the sleep mode in addition to a general wake-up signal) for requesting that the electronic device 100 gets out of the sleep mode in the sleep mode and get out of the sleep mode according to the wake-up command such that the transmission operation is also performed when the electronic device 100 operates in the sleep mode. A detailed configuration and operation of the electronic device 100 will be described below with reference to FIG. 3. The sleep mode may refer to a status in which a Central Processing Unit (CPU) of the electronic device 100 does not operate and may include a plurality of sleep modes (e.g., S2, S3, and S4 sleep modes). According to the present embodiment, the sleep mode may include a S5 mode. In this case, power is also supplied to a communication interface. In addition, a non-sleep mode (or a normal mode) is a status in which the CPU of the electronic device 100 operates.

The external computing device 200 may establish a network session with the electronic device 100 and transmit a wake-up command for the electronic device 100 through the established network session. A detailed configuration and operation of the external computing device 200 will be described below with reference to FIG. 4.

The firewall 10 is a system for protection against illegal access to internal to external information communication networks and external to internal information communication networks for security of information stored in the electronic device 100. The firewall 10 may perform functions in a router, an application gateway, and/or a wireless router/switch. According to the present embodiment, the firewall 10 is positioned between the external computing device 200 and the electronic device 100. However, alternatively, the wireless router/switch, the router, and the like, in addition to a firewall may be applied to any apparatus, a port of which is shut or an address of which is changed during access to an internal communication network.

When the firewall 10 is positioned between the electronic device 100 and the external computing device 200, the external computing device 200 may not wake the electronic device 100 using the WoL method. In detail, a magic packet used in the WoL includes a MAC address of a wake-up target and is transmitted through a connection layer as an OSI 2 layer. Thus, the magic packet may be broadcast in the same local subnet and may not be transmitted outside a subnet, and thus, the external computing device 200 outside the firewall 10 may not wake the electronic device 100 up using the WoL method.

However, when a network session is formed between an electronic device and an external computing device, even if a firewall exists between the electronic device and the external computing device, communication between the electronic device and the external computing device is possible.

Accordingly, according to the present embodiment, a network session is established between the electronic device 100 and the external computing device 200 and the established network session is maintained even if the electronic device 100 enters the sleep mode, and thus, a signal for requesting that that the electronic device 100 gets out the sleep mode may be transmitted through the formed network session. This operation will be described in detail with reference to FIG. 2.

Figure 2:
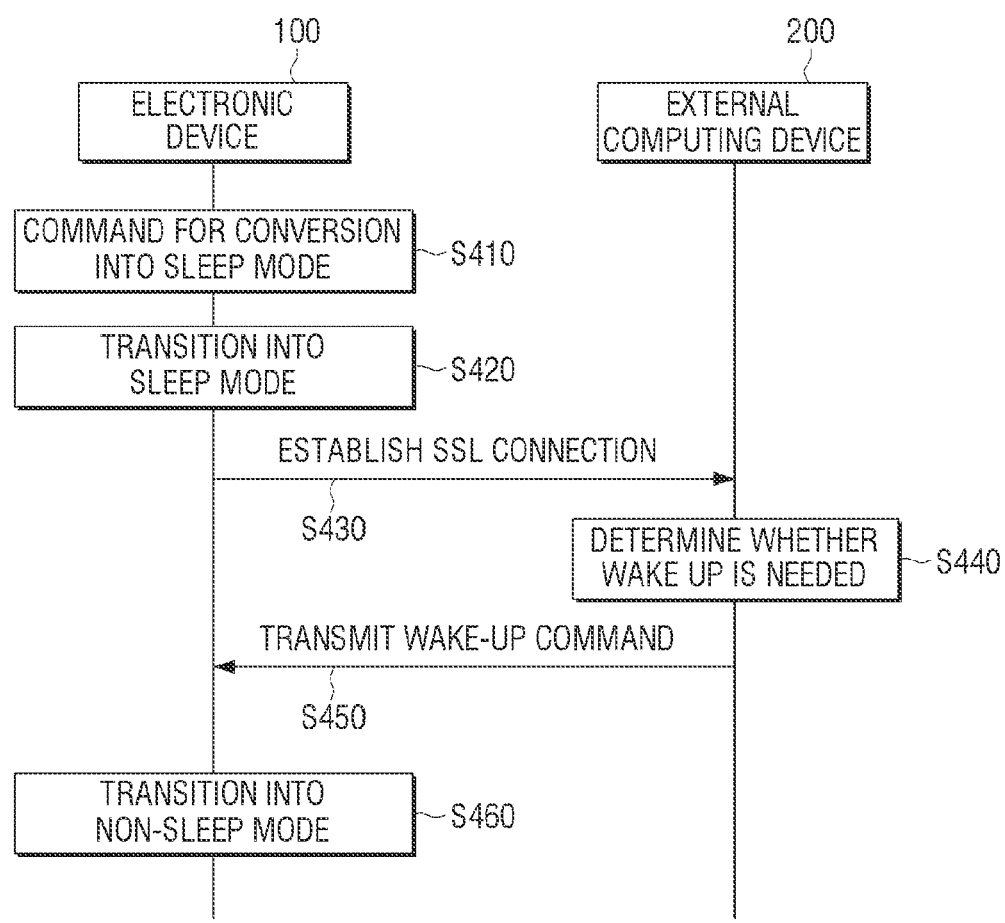
FIG. 2 is a sequence diagram for explanation of an operation of an electronic device and an external computing device according to an embodiment of the present disclosure.

FIG. 2 is a sequence diagram for explanation of an operation of an electronic device and an external computing device according to an embodiment of the present disclosure. Each operation of FIG. 2 may include a level, a status, and a mode.

Referring to FIG. 2, the electronic device 100 may determine whether an operating status needs to be transitioned into a sleep mode (S410). In detail, the electronic device 100 may determine to transition the operating status of the electronic device 100 into the sleep mode when a control command of a user is not received for a predetermined period of time, any operation is not performed for a predetermined period of time, and/or a conversion command into the sleep mode is received from a user.

As the determination result, upon determining that the operating status of the electronic device 100 needs to be transitioned, the electronic device 100 may transition the operating status into the sleep mode (S420). The sleep mode may be a status in which a CPU of the electronic device 100 does not operate and may include S2, S3, and S4 modes. According to the present embodiment, the sleep mode may include S5 (a power off mode). However, in this case, power may be supplied to a network apparatus in order to maintain a network session with a computing device.

In response to the operating status being transitioned, a network session with the external computing device 200 may be established (S430). The network session is logical connection for conversation between the electronic device 100 and the external computing device 200 in a network environment. For example, Secure Sockets Layer (SSL) connection may be established. In detail, the SSL connection is a communication protocol for encrypting and transmitting data between the external computing device 200 and the electronic device 100 in a transport layer and may also be referred to as Transport Layer Security (TLS). The SSL connection is an encryption method of a transport layer and may be used irrespective of a type of an application layer protocol such as Network News Transfer Protocol (NNTP), File Transfer Protocol (FTP), Extensible Messaging and Presence Protocol (XMPP), and the like, as well as Hyper-Text Transfer Protocol (HTTP).

In addition, the electronic device 100 may perform packet Internet groper (ping) for checking whether an IP datagram reaches the external computing device 200 in a predetermined period unit in the sleep mode in order to maintain the network session with the external computing device 200. The ping is an application program using a TCP/IP protocol and refers to a test for checking whether an IP datagram reaches another host.

After the electronic device 100 enters the sleep mode, the external computing device 200 may determine whether the electronic device 100 needs to wake up (S440). In detail, in response to request being received for content stored in the electronic device 100 from another electronic device (or a second electronic device (not illustrated), and hereinafter, referred to as the second electronic device) or request being received for a wake-up for requesting that the electronic device 100 gets out the sleep mode, from another electronic device, the external computing device 200 may determine that the electronic device 100 needs to wake up and transmit a wake-up command through the maintained network session (S450). The transmitted wake-up command may have a different format from the aforementioned wake-up transmitted to the external computing device 200 from the second electronic device.

The electronic device 100 that receives the wake-up command may transition the operating status of the electronic device 100 to a non-sleep mode from the sleep mode (S460). The sleep mode and the non-sleep mode may include one or more operations among operating statuses. For example, among the operating status including first to tenth operations, the first to fifth operations may be in a sleep mode and the sixth to tenth operations may be in a non-sleep mode. These operations may each include a level, a status, and a mode.

As described above, the electronic system 1000 according to the present embodiment may establish a network session between the electronic device 100 and the external computing device 200 and maintain the established network session even if the electronic device 100 enters a sleep mode. Thus even if the firewall 10 is positioned between the electronic device 100 and the external computing device 200, the external computing device 200 may wake the electronic device 100 up.

With regard to the description of FIGS. 1 and 2, the external computing device 200 is connected to one electronic device 100. However, in actual cases, the external computing device 200 may be connected to a plurality of electronic devices. In addition, the case in which only the firewall 10 is disposed between the external computing device 200 and the electronic device 100 has been described.

However, a relay apparatus such as a router, and the like, may be further disposed between the electronic device 100 and the external computing device 200.

Figure 3:
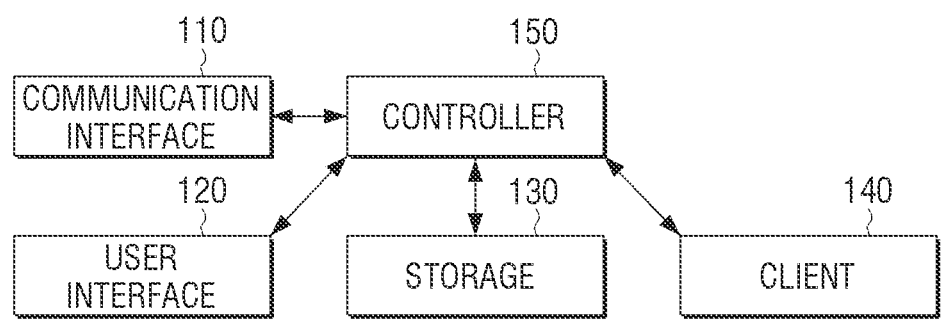
FIG. 3 is a block diagram illustrating a structure of an electronic device, for example, the electronic device of FIG. 1, according to an embodiment of the present disclosure.

FIG. 3 is a block diagram illustrating a structure of an electronic device, for example, the electronic device of FIG. 1 according to an embodiment of the present disclosure.

Referring to FIG. 3, an electronic device 100 according to an embodiment of the present disclosure may include a communication interface 110, a user interface 120, a storage 130, a client 140, and a controller 150. The electronic device 100 may be a desk top computer, a laptop computer, a mobile computing device, a smart phone, a feature phone, a tablet computer, a set top box, a wearable device, and the like, which are connectable with the Internet. When the electronic device 100 is a mobile device such as a mobile computing device and a smart phone, the electronic device 100 may have the form illustrated in FIG. 11.

The electronic device 100 may have a plurality of operating statuses. The plural operating statuses may include a non-operating status in which all components of the electronic device 100 operate and a sleep mode for an operation with lower power consumption than the non-sleep mode. According to the present embodiment, the electronic device 100 has only one sleep mode. However, in actual cases, the electronic device 100 may include a plurality of sleep modes as operating status.

The communication interface 110 may be formed for connecting the electronic device 100 to a computing electronic device (not shown) and may be connected to an external device via wireless communication (e.g., wireless communication such as Global System for Mobile communications (GSM), Universal Mobile Telecommunications System (UMTS), Long Term Evolution (LTE), Wireless Broadband (WiBRO), and the like) as well as via a Local Area Network (LAN) and the Internet. The computing electronic device may be the aforementioned external computing device or a separate electronic device.

In addition, the communication interface 110 may transmit and receive content to and from the computing electronic device 200. In detail, the communication interface 110 may receive a content supply command from the computing electronic device 200 and transmit content corresponding to the received content supply command to the computing electronic device 200. In addition, the communication interface 110 may transmit the content supply command to the computing electronic device and receive content corresponding to the transmitted supply command from the computing electronic device.

In addition, the communication interface 110 may receive information for establishing and maintaining a network session with the external computing device 200 from the computing electronic device. In detail, the communication interface 110 may receive address information of an external computing device, required for establishing the network session with the external computing device 200, and ping interval information required to maintain the network session, from the computing electronic device. According to the present embodiment, the information is received from the external computing device 200. However, in actual cases, the information may be received from a different device from the external computing device 200.

The information may be received from the external computing device 200 or received from a different device (e.g., a presence server) from the external computing device 200.

In addition, the communication interface 110 may establish a network session with the external computing device 200. In addition, before an operating status of the electronic device 100 is transitioned into a sleep mode, the communication interface 110 may transmit pre-received address information of the external computing device and establish a network session with the external computing device 200 in the sleep mode. The network session is logical connection between two devices in a network environment. In actual cases, SSL connection may be used. The SSL connection is a communication protocol for encrypting and transmitting data between the external computing device and the electronic device in a transport layer and may also be referred to as TLS. The SSL connection is an encryption method of a transport layer and may be used irrespective of a type of an application layer protocol such as NNTP, FTP, XMPP, and the like, as well as HTTP. According to the present embodiment, only SSL connection is used but in actual cases, other connections may be used.

In addition, the communication interface 110 may maintain a network session with the external computing device 200. In detail, the communication interface 110 may periodically transmit signals (e.g., ping) to the external computing device 200. In more detail, when the operating status of the electronic device 100 is a sleep mode, the communication interface 110 may also continuously perform ping on the external computing device 200 based on pre-received ping interval information to maintain the established network session. The ping is an application program using a TCP/IP protocol and refers to a test for checking whether an IP datagram reaches another host. According to the present embodiment, the network session is maintained using the ping. Alternatively, other technologies other than ping may be used as long as the network session is maintained.

In addition, when the operating status of the electronic device 100 is a sleep mode, the communication interface 110 may include a processor and a storage device (e.g., EEPROM) for self operation of the communication interface 110 without control of the controller 150, which will be described below.

In addition, in response to a wake-up command being received, the communication interface 110 may transition the operating status of the electronic device 100 into a non-sleep mode. In detail, when the operating status of the electronic device 100 is a sleep mode, in response to the wake-up command being received from the external computing device 200 through the maintained network session, the communication interface 110 may transmit the received wake-up command to the controller 150 (in detail, a micom).

The user interface 120 may include a plurality of functional keys for setting or selecting various functions supported by the electronic device 100 by a user and display various pieces of information provided by the electronic device 100. The user interface 120 may be embodied as a device that simultaneously achieves input and output, such as a touchscreen and may be embodied as a combination of an input device such as a keyboard and a mouse and a display device such as a Liquid Crystal Display (LCD) device.

In addition, the user interface 120 may display content. In detail, the user interface 120 may display content pre-stored in the storage 130 or display content received from a computing electronic device.

In addition, the user interface 120 may receive information for account authentication from the user and receive a transition command for transition of the operating status of the electronic device 100. The user interface 120 may operate in a power shut mode in which power supply is shut when the operating status of the electronic device 100 is a sleep mode.

The storage 130 may store a program for drive of the electronic device 100. In detail, the storage 130 may store a program as a set of various commands required to drive the electronic device 100. The program may include an operating program for drive of an application program as well as the application program for providing a specific service. The storage 130 may operate in a power shut mode in which power supply is shut when the operating status of the electronic device 100 is a sleep mode.

The storage 130 may store content. The storage 130 may store content received through the communication interface 110. In addition, the storage 130 may store an IP address (e.g., an SSL address) information of an external computing device, ping internal information, and the like, which are received from the external computing device 200. According to the present embodiment, the storage 130 stores network session information and ping interval information. However, in actual cases, a storage device of the communication interface 110 may store the information.

The storage 130 may be embodied as a storage medium of the electronic device 100 and an external storage medium, for example, a removable disk including a Universal Serial Bus (USB) memory, a web server via a network, etc.

The client 140 may provide a homesync service for the electronic device 100. The homesync service is a service that allows a user to freely use content shared by devices registered for user account. Accordingly, the client 140 may provide content stored in the electronic device 100 to the computing electronic device 200 and on the other hand, receive content stored in the computing electronic device 200. The client 140 operates when the operating status of the electronic device 100 is a non-sleep mode. That is, when the operating status of the electronic device 100 is a sleep mode, the client 140 may operate in a power shut mode in which power supply is shut.

The controller 150 may control each component of the electronic device 100. In detail, the controller 150 determines the operating status of the electronic device 100. In more detail, the controller 150 may determine to transition the operating status of the electronic device 100 into the sleep mode when user input is not received for a predetermined period of time, or a transition command into a sleep mode is received from a user.

In response to a wake-up command being received through the user interface 120 from the user in the sleep mode or a wake-up command being received from the external computing device 200 through the communication interface 110, the controller 150 may determine the operating status of the electronic device 100 as a non-sleep mode.

In addition, the controller 150 may control each component of the electronic device 100 in response to the determined operating status. In detail, when the operating status of the electronic device 100 is transition into a sleep mode, the controller 150 may perform control such that only predetermined components operate and the storage 130 and the client 140 do not operate. Prior to transition into a sleep mode, the controller 150 may control the communication interface 110 to establish a network session with the external computing device 200.

When the operating status of the electronic device 100 is transitioned into a non-sleep mode (nor a normal mode), the controller 150 may control each component of the electronic device 100 to wake up components that do not operate in the sleep mode.

In addition, when the operating status of the electronic device 100 is transitioned, the controller 150 may notify the external computing device 200 of transition of the operating status of the electronic device 100 and control the client 140 to provide a homesync service.

As described above, according to the present embodiment, the electronic device 100 establishes a network session with the external computing device 200 prior to a sleep mode and maintains the established network session even if the electronic device 100 enters the sleep mode, and thus may also receive a wake-up command from an external computing device outside a firewall in the sleep mode.

The electronic device 100 may act as a device for establishing a network session with the external computing device 200 or a device for requesting an external computing device for wake-up of the external computing device 200. Hereinafter, to this end, the device for establishing the network session will be referred to as a first electronic device and the device for requesting wake-up of the first electronic device will be referred to as the second electronic device.

Figure 4:
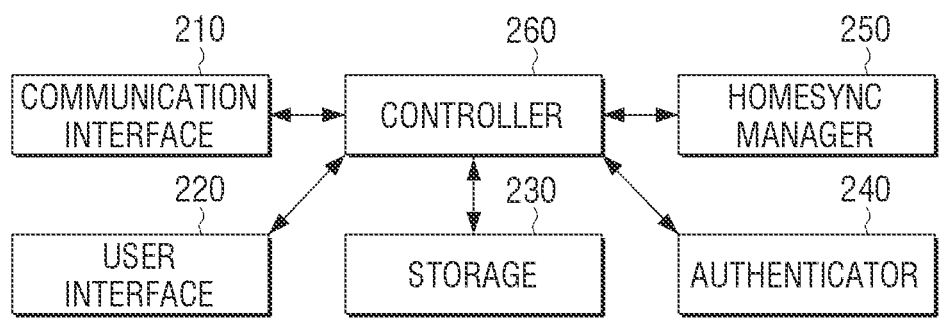
FIG. 4 is a block diagram illustrating a structure of an external computing device, for example, the external computing device of FIG. 1, according to an embodiment of the present disclosure.

FIG. 4 is a block diagram illustrating a structure of and external computing device, for example, the electronic device of FIG. 1 according to an embodiment of the present disclosure.

Referring to FIG. 4, an external computing device 200 according to an embodiment of the present disclosure may include a communication interface 210, a user interface 220, a storage 230, an authenticator 240, a homesync manager 250, and a controller 260. The external computing device 200 may be a Personal Computer (PC), a notebook PC, a server, and the like, which are connectable to the Internet.

The communication interface 210 may be formed for connecting the external computing device 200 to a computing electronic device and may be connected to an external device via wireless communication (e.g., wireless communication such as GSM, UMTS, LTE, WiBRO, etc.) as well as via a LAN and the Internet. The computing electronic device may be the electronic device 100 of FIG. 1 or another electronic device having the same function as the electronic device 100 of FIG. 1.

In addition, the communication interface 210 may transmit and receive content to and from the electronic device 100. In detail, the communication interface 210 may receive a content supply command from the electronic device 100 and transmit content corresponding to the received content supply command to the electronic device 100. In addition, the communication interface 210 may transmit the content supply command to the electronic device 100 and receive content corresponding to the transmitted supply command from the electronic device 100.

In addition, the external computing device 200 according to the present embodiment directly transmits and receives content. However, in actual cases, the communication interface 210 may perform relay for content transmission between two electronic devices. That is, in response to content request from the first electronic device, the communication interface 210 may control the second electronic device to transmit content corresponding to the request to the first electronic device from the second electronic device. In this case, content may be transmitted directly to the first electronic device from the second electronic device without an external computing device.

In addition, the communication interface 210 may transmit information for establishing and maintaining a network session to the first electronic device. In detail, the communication interface 210 may transmit address information (in detail, an IP address) of the external computing device 200, required for establishing the network session with the electronic device 100, and ping interval information required to maintain the network session. According to the present embodiment, the external computing device 200 transmits this information to the electronic device 100. However, in actual cases, the information may be transmitted to a different device from the external computing device. In addition, the IP address required to establish a network session may be an IP address of the external computing device 200 or an IP address of another device.

The communication interface 210 may establish a network session with the first electronic device. In detail, in response to a request for establishment of a network session being received from the first electronic device, the communication interface 210 may establish the network session with the electronic device. The network session may be logical connection between two devices in a network environment and may use SSL connection.

In addition, the communication interface 210 may maintain a network session with the first electronic device. In detail, in response to ping being received every predetermined period, the communication interface 210 may maintain the network session with the first electronic device.

The communication interface 210 may receive a wake-up request command of the first electronic device from the second electronic device. The communication interface 210 may transmit a wake-up command to the first electronic device using the maintained network session in response to the request. The transmitted wake-up command may have the same format as or a different format from the aforementioned wake-up command transmitted from the second electronic device.

In addition, the communication interface 210 may receive status information of the connected electronic device 100. In detail, the communication interface 210 may receive information such as device information, operating status, etc. of the connected electronic device 100. In addition, the communication interface 210 may receive information required for authentication from the electronic device 100. The information required for authentication may be an account and a code thereof. The account may be an identifier for identifying a user, such as an e-mail address, an ID, and the like.

The user interface 220 may include a plurality of function keys for setting or selecting various functions supported by the external computing device 200 and display various pieces of information provided by the external computing device 200. The user interface 220 may be embodied as a device that simultaneously achieves input and output, such as a touchscreen and may be embodied as a combination of an input device such as a keyboard and a mouse and a display device such as a Liquid Crystal Display (LCD) device.

In addition, the user interface 220 may display information of an electronic device connected to the external computing device 200. In this case, the user interface 220 may display information of each mode of the connected electronic device and information indicating whether the electronic device is connected.

The storage 230 may store a program for driving the external computing device 200. In detail, the storage 230 may store a program as a set of various commands required to drive the external computing device 200. The program may include an operating program for drive of an application program as well as the application program for providing a specific service.

The storage 230 may store content. The storage 230 may store content received through the communication interface 210. In addition, according to the present embodiment, the external computing device 200 stores content. However, in actual cases, the information may be stored in an external server or another electronic device.

The storage 230 may store user account information. In detail, the storage 230 may store account information for authentication, corresponding to an authentication request of the electronic device 100. The authentication information may be an account, a code thereof, information about a device contained in the account, and information about connected/disconnected status of the device contained in the account. According to the present embodiment, the information is stored in the external computing device 200. However, in actual cases, an external server may store the information, and a plurality of external servers instead of one external server may distribute and store the information.

The storage 230 may be embodied as a storage medium of the electronic device 100 and an external storage medium, for example, a removable disk including a Universal Serial Bus (USB) memory, a web server via a network, and the like.

The authenticator 240 may perform user authentication using pre-stored user account information and received user information in response to an authentication request of the electronic device 100.

The homesync manager 250 may provide a homesync service. In addition, the homesync manager 250 may manage connection with each electronic device so as to freely move content between plural electronic devices registered for user account.

In addition, in response to a wake-up command, for a first electronic device that is in a sleep mode, among a plurality of electronic devices required for user account, being received, the homesync manager 250 may control the communication interface 210 to transmit the wake-up command for the corresponding first electronic device.

The controller 260 (or a processor) may control each component of the external computing device 200. In detail, the controller 260 may control the communication interface 210 to transmit the information required for establishment of a network session to the electronic device 100 so as to establish the network session when the authenticated electronic device 100 enters a sleep mode.

In response to periodic signals being input from the first electronic device through the communication interface 210, the controller 260 may determine whether the first electronic device is in a non-sleep mode or a sleep mode. In detail, the controller 260 may determine whether the first electronic device is a sleep mode or a non-sleep mode based on at least one of the periodically received signals or at least one of absence of periodic signals. For example, in response to a keep alive message, indicating a status of the controller 260, being received, the controller 260 may determine that a device that transmits the keep alive message is in a non-sleep mode, and in response to a signal for maintaining a network session, being received, the controller 260 may determine that the device is in a sleep mode.

In addition, in response to a request for establishment of a network, being received from the first electronic device, the controller 260 may control the communication interface 210 to establish a network session with the first electronic device. In response to the wake-up request for the first electronic device, being received from the second electronic device, the controller 260 may control the communication interface 210 to transmit the wake-up command to the first electronic device.

In response to content being received from the second electronic device, the controller 260 may control the communication interface 210 to transmit the received content to the first electronic device. On the other hand, in response to content being received from the first electronic device, the controller 260 may control the communication interface 210 to transmit the received content to the second electronic device.

In addition, when a plurality of electronic devices is connected to the external computing device 200, the controller 260 may control the homesync manager 250 to provide a homesync service for the plural connected electronic devices.

As described above, the external computing device 200 according to the present embodiment may maintain a network session with an electronic device even if the electronic device enters the sleep mode, and thus the external computing device 200 may transmit a wake-up command to an electronic device outside a firewall.

The aforementioned electronic device and external computing device may be applied to a homesync system. Hereinafter, operations of a homesync system and the electronic device and external computing device applied to the homesync system will be described with reference to FIGS. 5 to 8.

Figure 5:
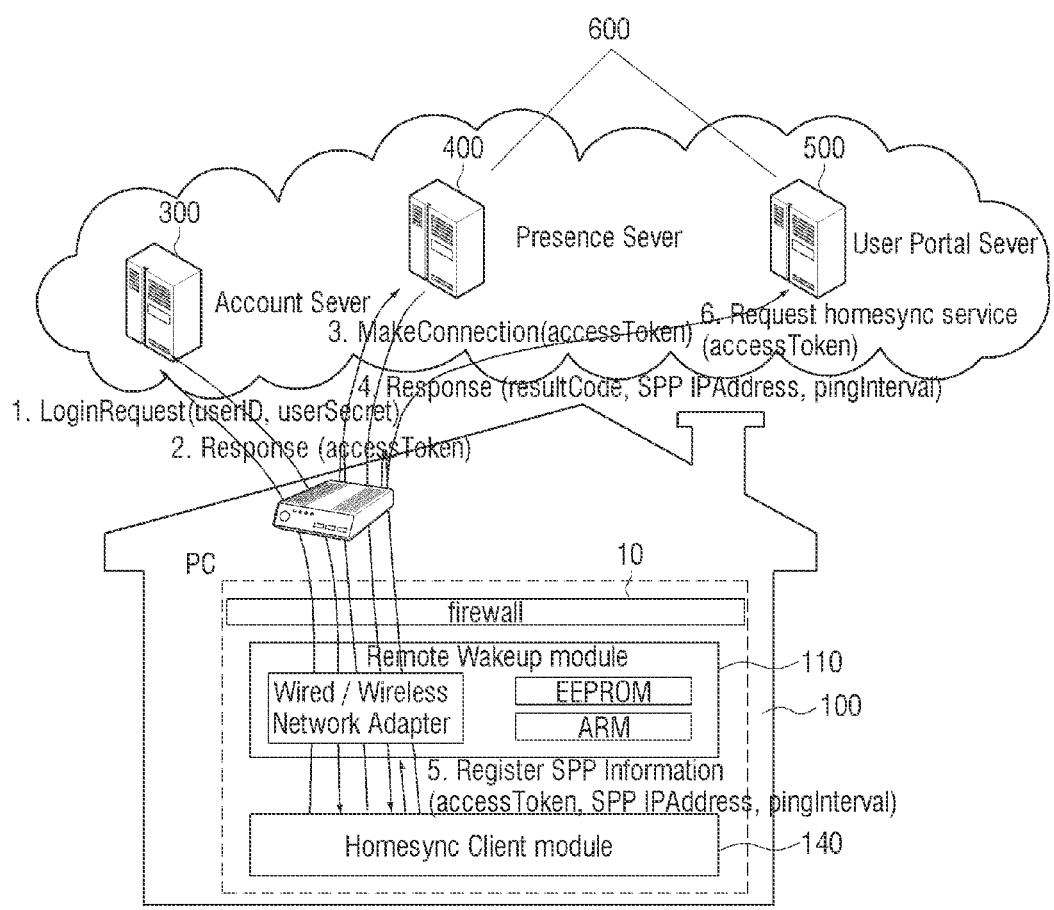
FIGS. 5, 6, and 7 are diagrams for explanation of an operation of an electronic system according to another embodiment of the present disclosure.
Figure 6:
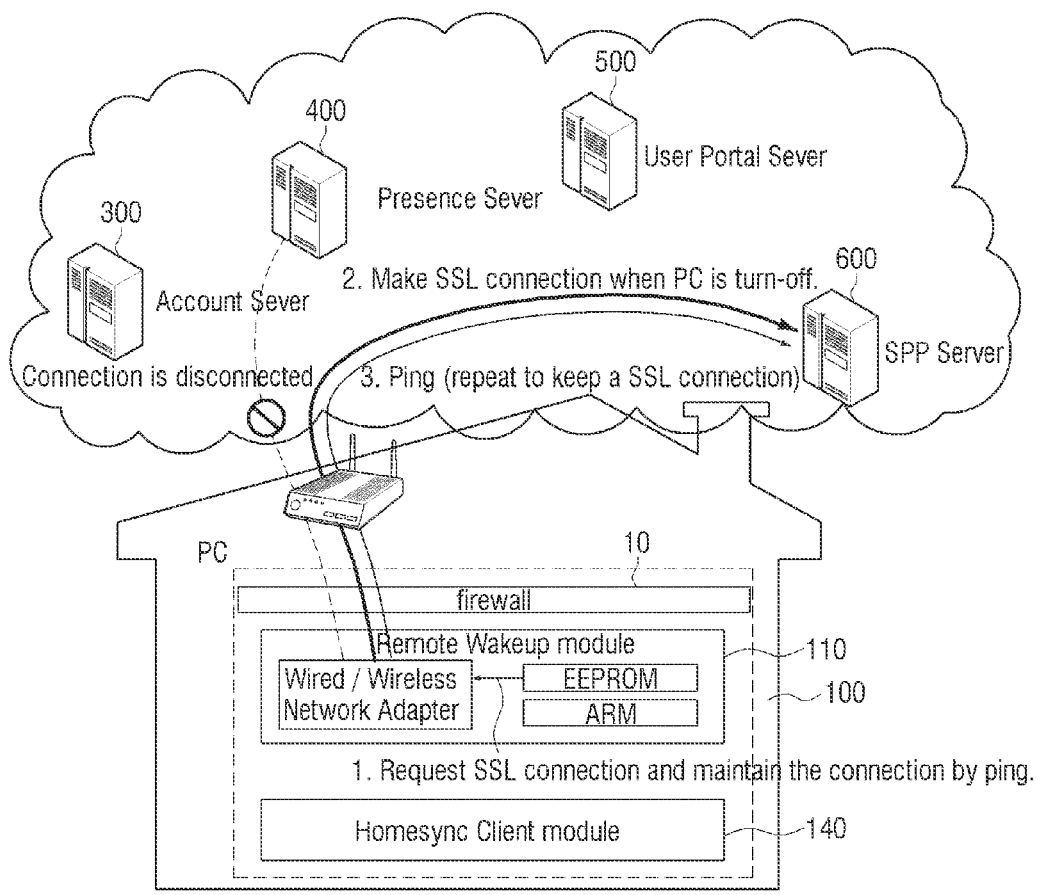
Figure 7:
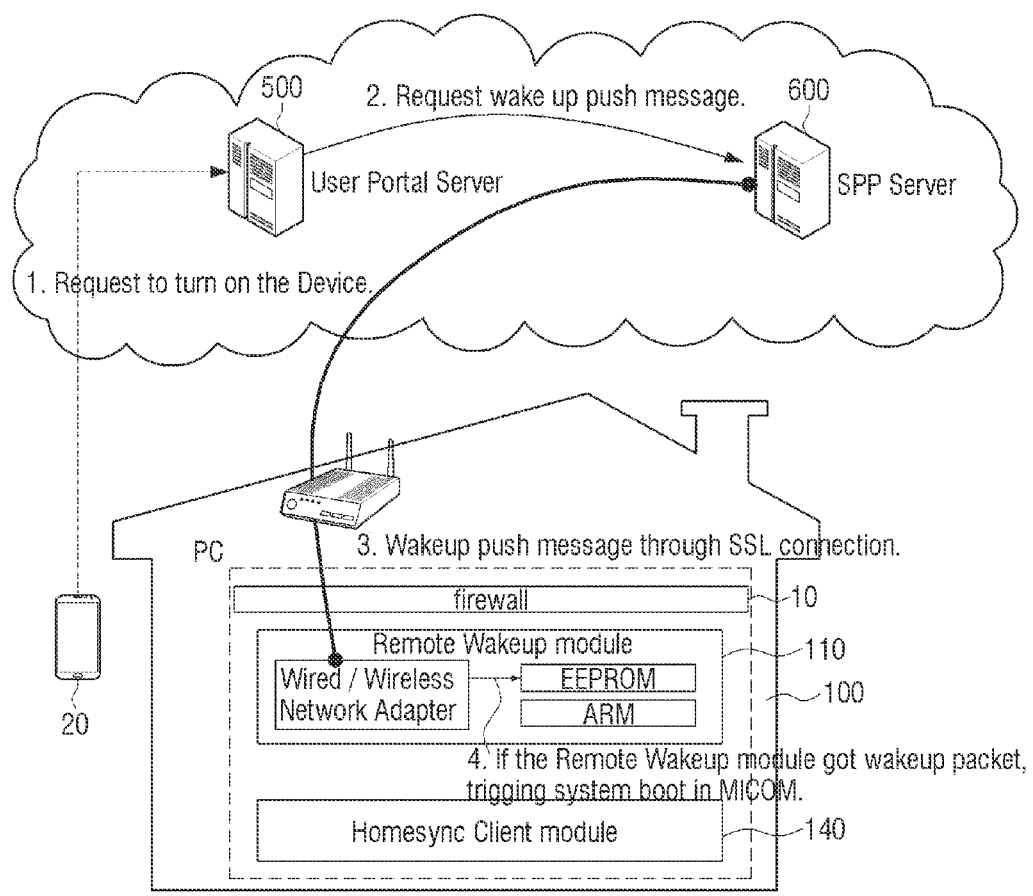

FIGS. 5 to 7 are diagrams for explanation of an operation of an electronic system according to an embodiment of the present disclosure. Hereinafter, a limited case in which an SSL connection is used as a network session will be described.

Referring to FIGS. 5-7, a homesync system is a system in which a separate server recognizes statuses of a plurality of electronic devices and generates a data path between the plural electronic devices for content share between the plural electronic devices.

According to a homesync service, a user may form account, register devices being used in a homesync server, and share a media content file in a first electronic device.

When this operation is performed, the user may use the media content file in the first electronic device via a log-in procedure via the homesync server in the second electronic device.

Hereinafter, a log-in operation for a homesync server will be descried with reference to FIG. 5.

Referring to FIG. 5, the electronic device 100 is connected to a plurality of servers 300, 400, 500, and 600. In addition, the firewall 10 may be positioned between the electronic device 100 and the plural servers 300, 400, 500, and 600. In this case, the electronic device 100 may be in a non-sleep mode and may transmit a keep alive message indicating that the electronic device 100 operates to a presence server 400. The keep alive message may be signals configured in conformity with a communication protocol between the electronic device 100 and the external computing device 200 and may be periodically transmitted.

An account server 300 may store account information for a user and perform user authentication on the electronic device 100 that requests connection. Accordingly, when an operating status of the electronic device 100 is a non-sleep mode or a normal mode, the electronic device 100 may receive authentication information from the user and transmit the received authentication information to the account server 300.

In addition, the account server 300 may transmit access-Token to be used during use of a homesync service for an authenticated user to an authenticated electronic device.

The presence server 400 is a server that manages connected/disconnected status of an electronic device connected to a homesync service. When the connected/disconnected status is updated, the presence server 400 may notify a device that wants to receive an event for an electronic device, the connected/disconnected status of which is updated of change in the connected/disconnected status as an event. For example, the presence server 400 may notify another electronic device (i.e., another electronic device of a user) that wants to receive information about the connected/disconnected status of a logged-in first electronic device of information indicating that the first electronic device is connected.

A user portal server 500 may be a server providing a homesync service and may manage a status and information about a device registered for a user account.

The user may use data and media contents shared by devices registered by the user using a homesync service in a device including homesync installed therein anytime.

However, when a registered device is turned off or is in a sleep mode, the user may not use required data. Accordingly, it is necessary to wake up a device in a sleep mode.

A Samsung Push (SPP) server 600 may be a server for establishing an SPP connection with the electronic device 100 when an operating status of the electronic device 100 is a sleep mode and may transmit information associated with a position of the SPP server 600 and ping interval information to the electronic device 100. The information associated with the position of the SPP server 600 may include an IP address, a session ID, and a key. FIG. 5 illustrates the case in which the presence server 400 and the user portal server 500 operate as an SPP server. However, in actual cases, a separate SPP server that is different from the presence server 400 and the user portal server 500 may be used. This example will be described below with reference to FIG. 6.

Accordingly, according to the present embodiment, when an operating status of the electronic device 100 is a sleep mode, SSL connection between the electronic device 100 and the external computing device 200 may be established such that the external computing device 200 wake up the electronic device 100 even if the electronic device 100 is in a sleep mode.

The external computing device 200 may include at least one of the account server 300, the presence server 400, the user portal server 500, and the SPP servers 600. The plural servers 300, 400, 500, and 600 may be combined or may each be separate server.

Hereinafter, an operation of establishing SSL connection will be described with reference to FIG. 6.

Referring to FIG. 6, when an operating status of the electronic device 100 is transitioned into a sleep mode, the electronic device 100 establishes SSL connection with the SPP server 600. In detail, the electronic device 100 may establish SSL connection with the SPP server 600 using SSL address information (IP address of SSL server) received during the aforementioned log-in procedure of FIG. 5.

After the SSL connection is established, the electronic device 100 may transition the operating status into the sleep mode and may periodically transmit signals to maintain the SSL connection with the SPP server 600 in the sleep mode. The signal may be configured in conformity with a communication protocol between the electronic device 100 and the SPP server 600.

A presence server may stop receiving the keep alive message transmitted from the electronic device 100 and recognize that the first electronic device enters a sleep mode based on this.

Hereinafter, a wake-up operation of the electronic device 100 after establishment of SSL connection between the electronic device 100 and the SPP server 600 will be described with reference to FIG. 7.

Referring to FIG. 7, the second electronic device 20 may request the user portal server 500 for wake-up of the first electronic device 100. The second electronic device 20 is a device registered for the same account as the first electronic device 100 and is in a log-in state for the account.

The user portal server 500 that receives the wake-up request may notify the SPP server 600 of the reception of the wake-up request, and the external computing device 200 may transmit the wake-up command through the maintained SSL.

The SPP server 600 and the electronic device 100 may be connected through the SSL and may transmit and receive data (in detail, a wake-up command) without influence of the firewall 10. Accordingly, the wake-up command transmitted from the SPP server 600 may be transmitted to the electronic device 100 despite the firewall 10.

An operating status of the electronic device 100 that receives the wake-up command may be transitioned into a non-sleep mode.

Figure 8:
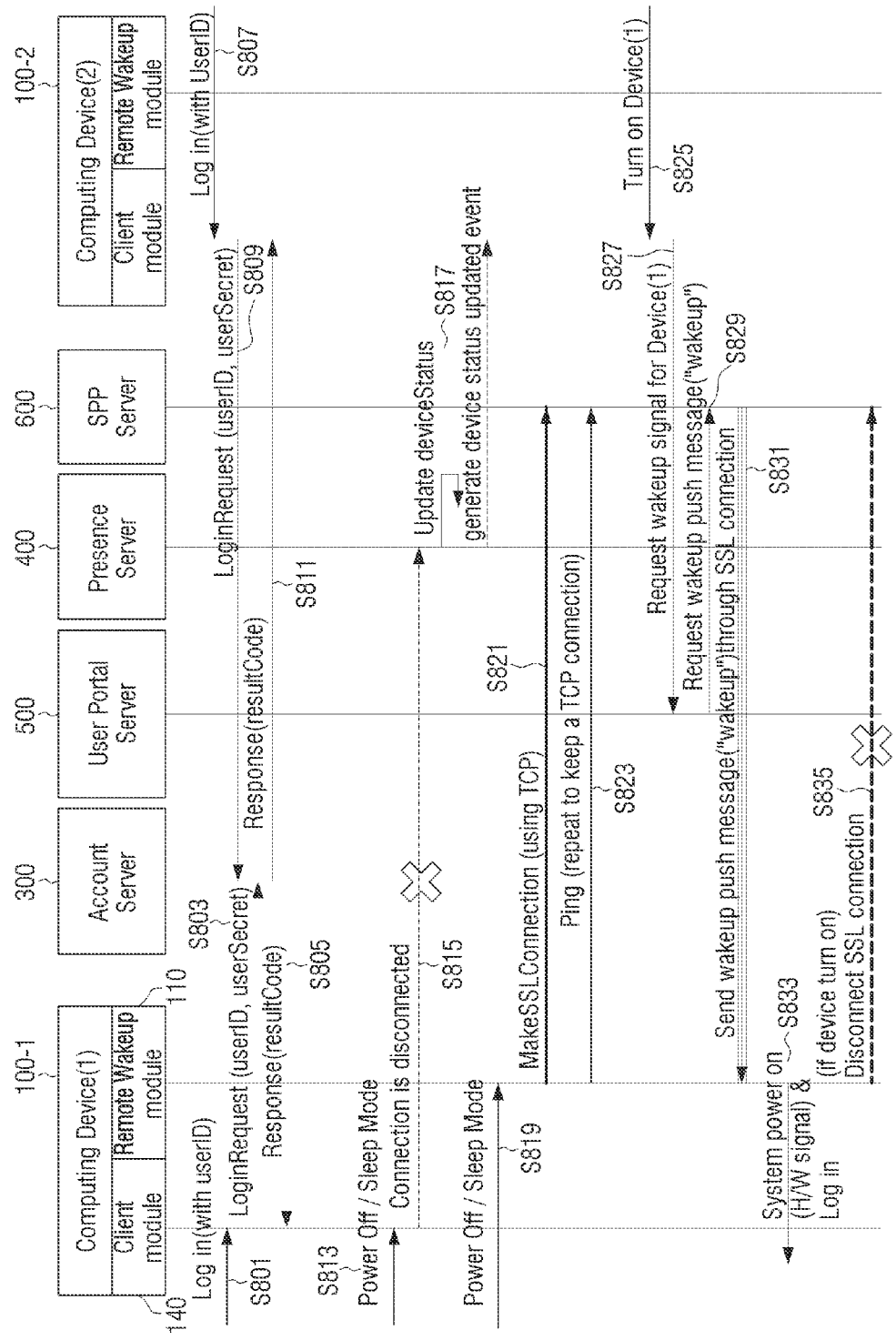
FIG. 8 is a sequence diagram for explanation of an electronic system according to another embodiment of the present disclosure.

The aforementioned operation of FIGS. 5 to 7 is summarized as one diagram that is FIG. 8. With reference to FIGS. 5 to 7, the case in which SSL connection between the electronic device 100 and an external computing device is established after an operating status of the electronic device 100 is transitioned into a sleep mode has been described above. However, in actual cases, the SSL connection may be established before a sleep mode of the electronic device 100 is transitioned. That is, after the SSL connection between the electronic device 100 and the external computing device is established, the operating status of the electronic device 100 may be transitioned into a sleep mode.

FIG. 8 is a sequence diagram for explanation of an electronic system according to another embodiment of the present disclosure.

Referring to FIG. 8, a user may input account information of the user to the first electronic device 100-1 (S801) and the client 140 may transmit the account information to the account server 300 to perform authentication (S803). In this case, the account server 300 may transmit accessToken to the authenticated user (S805). This operation may be performed in the same way on another electronic device 100-2 of the user (S807, S809, and S811)

When the user does not use the first electronic device 100-1 and thus determines to transition the operating status of the first electronic device 100-1 into a sleep mode (S813), a client 140 of the first electronic device 100-1 may notify a presence server (presence) of information indicating an operating status is transitioned (S817) and the presence server (presence) may notify the second electronic device 100-2 of conversion of the operating status of the first electronic device 100-1. When a network session between the client 140 and a presence server 440 is disconnected, the presence server (presence) may recognize that the operating status of the first electronic device 100-1 is transitioned into a sleep mode (S815).

Upon determining to transition the operating status of the first electronic device 100-1 into the sleep mode, the first electronic device 100-1 may transition the operating status into the sleep mode (S819) and a communication interface 110 of the first electronic device 100-1 may establish SSL connection with the SPP server 600 (S821). In actual cases, an order of a conversion operation and an SSL connection establishment operation may be changed.

The client 140 of the first electronic device 100-1, the operating status of which is transitioned into the sleep mode, may not operate any longer and only the communication interface 110 may perform ping on the SPP server 600 every predetermined period to maintain SSL connection (S823).

In this status, when the second electronic device 100-2 wants to receive content stored in the first electronic device 100-1 (S825), a communication interface (not illustrated) of the second electronic device 100-2 may request the user portal server 500 for wake-up of the first electronic device 100-1 so as to wake up the first electronic device 100-1 (S827) and the user portal server 500 may request the SPP server 600 for wake-up of the first electronic device 100-1 (S829).

The SPP server 600 that receive the wake-up request transmits a wake-up command to the communication interface 110 of the first electronic device 100-1 through the maintained SSL connection (S831). The communication interface 110 that receives the wake-up command may transition the operating status of the first electronic device 100-1 into a non-sleep mode (S833).

When the operating status of the first electronic device 100-1 is transitioned into the non-sleep mode, SSL connection between the first electronic device 100-1 and the SPP server 600 may be disconnected (S835).

With reference to FIGS. 5 to 8, the case in which the external computing device includes a plurality of servers has been described. However, in actual cases, that the external computing device maybe configured as one device.

Figure 9:
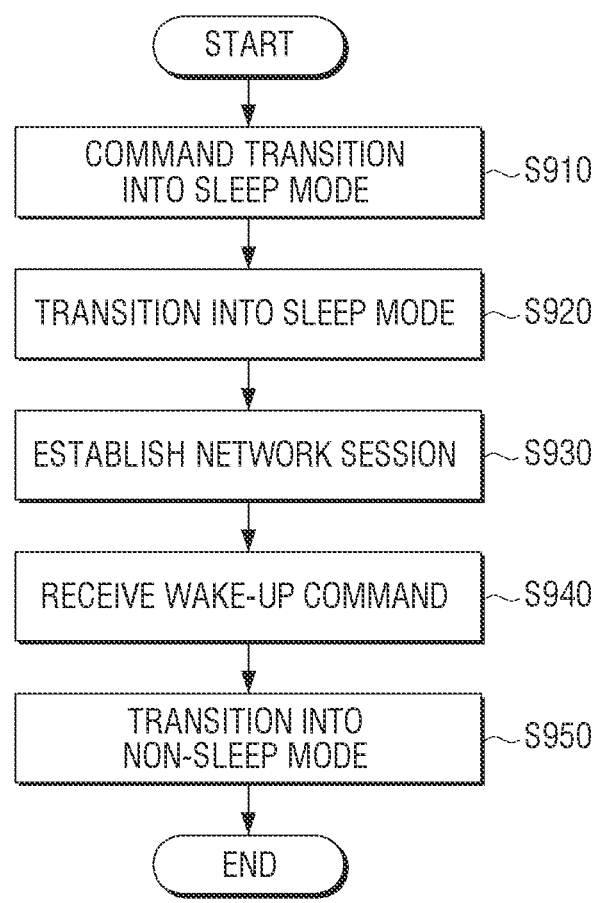
FIG. 9 is a flowchart for explanation of a method of controlling drive of an electronic device according to an embodiment of the present disclosure.

FIG. 9 is a flowchart for explanation of a method of controlling drive of an electronic device according to an embodiment of the present disclosure.

Referring to FIG. 9, whether an operating status of the electronic device needs to be transitioned into a sleep mode may be determined (S910). In detail, when a control command of a user is not received for a predetermined period of time or any operation is not performed for a predetermined period of time, it may be determined to transition the operating status into the sleep mode.

As the determination result, upon determining that the operating status of the electronic device needs to be transitioned, the operating status of the electronic device may be transitioned into the sleep mode (S920).

In response to the operating status being transitioned, a network session with an external computing device may be established (S930). In detail, SSL connection with the external computing device may be established using a pre-stored IP address of the external computing device. According to the present embodiment, the network session is established after the operating status is transitioned. However, in actual cases, an operating status may be transitioned into the sleep mode after the network session is established.

Even if the operating status of the electronic device is transitioned into the sleep mode, the communication interface 110 may receive power and operate using a process included in the communication interface 100 and transmit a ping heartbeat signal to an external computing device in predetermine period units. Accordingly, the established network session with the external computing device may be maintained.

When the operating status is a sleep mode, in response to a wake-up command being received (S940), the operating status may be transitioned into a non-sleep mode from the sleep mode (S950). In detail, in response to the wake-up command being received from the external computing device through the maintained network session, the operating status of the electronic device 100 may be transitioned into a non-sleep mode.

As described above, the method of controlling drive of an electronic device according to the present embodiment may establish a network session with an external computing device prior to entrance into the sleep mode and maintain the established network session despite entrance into the sleep mode. Accordingly, the electronic device may receive a wake-up command from the external computing device outside a firewall even if the electronic device is in a sleep mode. The driving control method of FIG. 9 may be executed by the electronic device including the components of FIG. 3 and executed by an electronic device including other components.

In addition, the aforementioned method of controlling drive of an electronic device may be embodied as a program including an algorithm executed in a computer. The program may be stored and provided in a non-transitory computer readable medium.

The non-transitory computer readable medium is a medium that semi-permanently stores data and from which data is readable by a device, but not a medium that stores data for a short time, such as register, a cache, a memory, and the like. In detail, the aforementioned various applications or programs may be stored in the non-transitory computer readable medium, for example, a Compact Disc (CD), a Digital Versatile Disc (DVD), a hard disc, a bluray disc, a Universal Serial Bus (USB), a memory card, a Read Only Memory (ROM), and the like, and may be provided.

Figure 10:
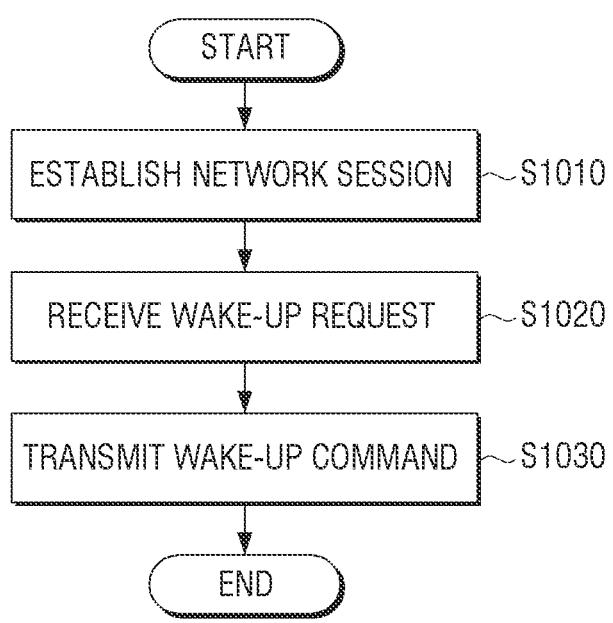
FIG. 10 is a flowchart for explanation of a method of controlling drive of an external computing device according to an embodiment of the present disclosure.

FIG. 10 is a flowchart for explanation of a method of controlling drive of an external computing device according to an embodiment of the present disclosure.

Referring to FIG. 10, according to a request of the first electronic device 100-1, a network session with the first electronic device 100-1 may be established (S1010).

In response to a wake-up request for the first electronic device 100-1, being received from the second electronic device 100-2 (S1020), a wake-up command may be transmitted to the first electronic device 100-1 through the established network session with the first electronic device 100-1 (S1030). The wake-up command transmitted from the first electronic device 100-1 may have the same format or different format from the wake-up command received from the second electronic device 100-2.

Through this procedure, when the second electronic device 100-2 is transitioned into a non-sleep mode, content between the first electronic device 100-1 and the second electronic device 100-2 may be transmitted and received.

As described above, the method of controlling drive of an external computing device according to the present embodiment may maintain a network session even if an electronic device enters a sleep mode. Accordingly, the external computing device may transmit a wake-up command to an external electronic device. The driving control method of FIG. 10 may be executed by the external computing device including the components of FIG. 4 and executed by an electronic device including other components.

In addition, the aforementioned method of controlling drive of an external computing device may be embodied as a program including an algorithm executed in a computer. The program may be stored and provided in a non-transitory computer readable medium.

Figure 11:
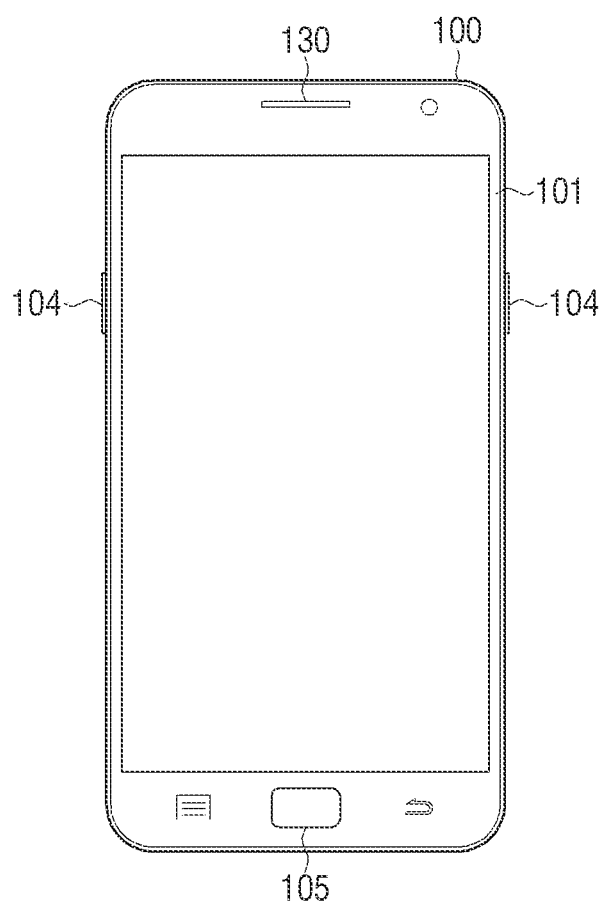
FIG. 11 is a diagram illustrating a shape of the electronic device of FIG. 1 according to an embodiment of the present disclosure.

FIG. 11 is a diagram illustrating a shape of an electronic device of FIG. 1 according to an embodiment of the present disclosure.

Referring to FIG. 11, the electronic device 100 may be a mobile device 100 and may include a housing 101, a display 102, a speaker 103, and a plurality of buttons 104 and 105.

The housing 101 may support each component of the mobile device 100 and may be a case.

The display 102 may be disposed on one surface of the housing 101.

The speaker 103 may be disposed on the same surface as the display 102.

The plural buttons 104 and 105 may be disposed on one surface of the housing 101 and disposed on another different surface of the housing 101 from the display 102 or on the same surface as the display 102.

The electronic device 100 may operate as the aforementioned second electronic device 100-2 and transmit a wake-up command of another electronic device and a request of content stored in another electronic device to the external computing device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device connected to an external computing device, the electronic device comprising:
   a controller configured to transition the electronic device into a sleep mode; and
   a communication interface configured to establish a network session with the external computing device when the electronic device transition into the sleep mode,
   wherein the communication interface is further configured to maintain the network session with the external computing device when the electronic device is in the sleep mode, and to transition the electronic device into a non-sleep mode in response to a signal, for requesting that the electronic device gets out the sleep mode, being received through the maintained network session.

2. The electronic device as claimed in claim 1, wherein the network session comprises Secure Sockets Layer (SSL) connection.

3. The electronic device as claimed in claim 1, wherein the communication interface is further configured to communicate with the external computing device through at least one of a wireless router/switch, a router, and a firewall.

4. The electronic device as claimed in claim 1, wherein the communication interface is further configured to periodically transmit signals to the external computing device.

5. The electronic device as claimed in claim 4, wherein the communication interface is further configured to receive a signal from the external computing device after transmitting at least one of the periodically transmitted signals to the external computing device.

6. The electronic device as claimed in claim 1, wherein the communication interface is further configured to receive power even if the electronic device is in the sleep mode.

7. The electronic device as claimed in claim 1, further comprising a storage configured to store content,
   wherein the communication interface is further configured to provide the stored content to an external mobile device.

8. The electronic device as claimed in claim 1, wherein the communication interface is further configured to receive content from an external mobile device.

9. The electronic device as claimed in claim 1, wherein the communication interface is further configured to receive an Internet Protocol (IP) address of the external computing device from the external computing device.

10. The electronic device as claimed in claim 1, wherein the external computing device comprises at least one server.

11. The electronic device as claimed in claim 1, wherein the electronic device comprises one of a desk top computer, a lap top computer, a mobile computing device, a smart phone, a feature phone, a tablet computer, a set top box, and a wearable device.

12. The electronic device as claimed in claim 1, further comprising:
 a housing;
 a display disposed on one surface of the housing; and
 a button disposed adjacent to the one surface of the housing.

13. A method of controlling drive of an electronic device connected to an external computing device, the method comprising;
 transitioning the electronic device into a sleep mode;
 establishing a network session with the external computing device when the electronic device transitions into the sleep mode;
 maintaining the network session with the external computing device when the electronic device is in the sleep mode; and
 transitioning the electronic device into a non-sleep mode in response to a signal, for requesting that the electronic device gets out the sleep mode, being received through the maintained network session.

14. The method as claimed in claim 13, wherein the maintaining of the network session with the external computing device comprises periodically transmitting signals to the external computing device.

15. A system comprising:
 an external computing device;
 a first electronic device configured to establish a network session with the external computing device when the electronic device transitions into the sleep mode and to maintain the network session with the external computing device in the sleep mode; and
 a second electronic device configured to transmit a signal requesting that the first electronic device transition out of the sleep mode, to the external computing device,
 wherein the external computing device is configured to transmit a second request signal for conversion of the first electronic device into a non-sleep mode through the maintained network session in response to the first request signal being received.

16. The system of claim 15, wherein the network session is maintained by a periodic keep-alive message between the first electronic device and the external computing device.

* * * * *